US012749623B2

(12) United States Patent
Jeong et al.

(10) Patent No.: US 12,749,623 B2
(45) Date of Patent: Sep. 29, 2026

(54) MULTILAYERED CAPACITOR AND MANUFACTURING METHOD THEREOF

(71) Applicant: SAMSUNG ELECTRO-MECHANICS CO., LTD., Suwon-si (KR)

(72) Inventors: Doyoung Jeong, Suwon-si (KR); Jeongmo Kang, Suwon-si (KR); Inkyung Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 26 days.

(21) Appl. No.: 18/583,228

(22) Filed: Feb. 21, 2024

(65) Prior Publication Data

US 2024/0312715 A1 Sep. 19, 2024

(30) Foreign Application Priority Data

Mar. 16, 2023 (KR) ........................ 10-2023-0034339

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ............................... H01G 4/2325; H01G 4/30
See application file for complete search history.

(56) References Cited

U.S. PATENT DOCUMENTS

2001/0017420 A1* 8/2001 Iwao .................. H01F 17/0013 257/693
2004/0072079 A1* 4/2004 Hashimoto ........... H01M 4/662 429/231.1
2015/0034701 A1 2/2015 Takaoka et al.
2018/0082787 A1* 3/2018 Hamamori ............. H01G 4/232
2018/0108481 A1* 4/2018 Tomizawa ........... H01G 4/2325
2019/0013150 A1 1/2019 Koo et al.
2020/0168400 A1* 5/2020 Nakamoto ............... H01G 4/30
2020/0411247 A1* 12/2020 Saruban ................... H01G 4/12
2021/0035736 A1* 2/2021 Cha .......................... H01G 4/30
(Continued)

FOREIGN PATENT DOCUMENTS

EP 2824681 A1 1/2015
JP 2018-049883 A 3/2018
(Continued)

OTHER PUBLICATIONS

Extended European Search Report dated Aug. 16, 2024, issued in corresponding European Patent Application No. 24163812.1.
(Continued)

*Primary Examiner* — Michael P McFadden
(74) *Attorney, Agent, or Firm* — Morgan, Lewis & Bockius LLP

(57) ABSTRACT

Disclosed is multilayered capacitor that includes a capacitor body including a dielectric layer and an internal electrode, and an external electrode outside the capacitor body, wherein the external electrode includes a metal layer having surface roughness disposed outside the capacitor body and including a first conductive metal, and a conductive resin layer including a resin and a second conductive metal.

20 Claims, 5 Drawing Sheets

(56) References Cited

U.S. PATENT DOCUMENTS

| | | | | |
|---|---|---|---|---|
| 2021/0343478 | A1* | 11/2021 | Kojima | H01R 12/57 |
| 2021/0398747 | A1 | 12/2021 | Onodera | |
| 2022/0139618 | A1 | 5/2022 | Kang et al. | |
| 2022/0208473 | A1* | 6/2022 | Yun | H01G 4/232 |
| 2022/0392707 | A1 | 12/2022 | Lee et al. | |
| 2023/0119122 | A1 | 4/2023 | Han et al. | |

FOREIGN PATENT DOCUMENTS

| | | | |
|---|---|---|---|
| JP | 2020-088191 | A | 6/2020 |
| KR | 10-2019-0008406 | A | 1/2019 |
| KR | 10-2292798 | B1 | 8/2021 |
| KR | 10-2022-0059824 | A | 5/2022 |
| KR | 10-2505434 | B1 | 3/2023 |

OTHER PUBLICATIONS

Office Action issued on July 1, 202 in Korean Patent Application No. 10-2023-0034339 with English translation.

* cited by examiner

MULTILAYERED CAPACITOR AND MANUFACTURING METHOD THEREOF

CROSS-REFERENCE TO RELATED APPLICATION

This application claims priority to and the benefit of Korean Patent Application No. 10-2023-0034339 filed in the Korean Intellectual Property Office on Mar. 16, 2023, the entire contents of which are incorporated herein by reference.

This disclosure relates to a multilayered capacitor and a manufacturing method thereof.

A multilayered capacitor (MLCC) is able to realize small high capacity and thus being used for various electronic devices. Recently increasing interests in self-driving and electric vehicles increase a demand for electric power drive systems in the vehicles, which also increases a demand for a multilayered capacitor for the vehicles.

The multilayered capacitor for vehicles requires high electrical reliability and impact resistance. In particular, required is a multilayered capacitor with excellent durability by deformation of the mounted board, that is, excellent bending strength characteristics.

SUMMARY

One aspect of the present disclosure may provide a multilayered capacitor having enhanced bending strength characteristics while securing equivalent series resistance (ESR) characteristics.

A multilayered capacitor according to one aspect includes a capacitor body including a dielectric layer and an internal electrode, and an external electrode outside the capacitor body, wherein the external electrode includes a metal layer disposed outside the capacitor body and comprises a first conductive metal, and a conductive resin layer disposed outside the metal layer and including a resin, a second conductive metal, a low melting point metal having a melting point lower than that of the second conductive metal, and an alloy of the second conductive metal and the low melting point metal.

The multilayered capacitor may have a first direction that is a direction in which the dielectric layer and internal electrode are stacked, and a second direction and a third direction perpendicular to the first direction and perpendicular to each other.

The capacitor body may have first and second surfaces facing each other in a first direction, third and fourth surfaces facing each other in a second direction, and fifth and sixth surfaces facing each other in a third direction.

The metal layer may have a surface roughness on an outer surface.

In a cross section cut in the first direction and the third direction perpendicular to the second direction at a center of the second direction, an average surface roughness (Ra) of the metal layer may be about 0.2 to about 1.

The metal layer may not include glass and a binder resin.

In a cross section cut in the first direction and the third direction perpendicular to the second direction at a center of the second direction, the metal layer may have an area ratio of the glass included in a unit area of the metal layer relative a unit area of the metal layer of less than or equal to about 2%.

In a cross section cut in the first direction and the third direction perpendicular to the second direction at a center of the second direction, the metal layer may have an area ratio of the binder resin included in a unit area of the metal layer relative a unit area of the metal layer of less than or equal to about 1%.

The first conductive metal or the second conductive metal may include at least one selected from the group consisting of copper (Cu), nickel (Ni), silver (Ag), palladium (Pd), gold (Au), platinum (Pt), tungsten (W), titanium (Ti), an alloy thereof, and combinations thereof.

The low melting point metal may include at least one selected from the group consisting of tin (Sn), lead (Pb), bismuth (Bi), silver (Ag), copper (Cu), an alloy thereof, and combinations thereof.

In a cross section cut in the first direction and the third direction perpendicular to the second direction at a center of the second direction, the conductive resin layer has an area ratio of the resin included in the unit area of the conductive resin layer relative a unit area of the conductive resin layer of about 5% to about 30%.

In a cross section cut in the first direction and the third direction perpendicular to the second direction at a center of the second direction, the conductive resin layer may have each area ratio of the second conductive metal, the low melting point metal, and the alloy of the second conductive metal and the low melting point metal included in the unit area of the conductive resin layer relative a unit area of the conductive resin layer of about 5% to about 30%.

The external electrode may further include a plating layer outside the conductive resin layer.

The external electrode may have a connection portion contacted with the third and fourth surfaces of the capacitor body and a band portion extending from the connection portion onto the first and second surfaces and the fifth and sixth surfaces of the capacitor body.

The metal layer, the conductive resin layer, and the plating layer may be disposed on the connection portion and the band portion.

The metal layer may be disposed on the connection portion and the band portion, the conductive resin layer may be disposed on the band portion, and the plating layer may be disposed on the connection portion and the band portion.

A method of manufacturing a multilayered capacitor according to another aspect includes manufacturing a capacitor body including a dielectric layer and an internal electrode, and forming an external electrode disposed on outer surface of the capacitor body.

The forming of the external electrode includes forming a metal layer including a first conductive metal, and coating a paste for a conductive resin layer including a second conductive metal powder, a low melting point metal having a melting point lower than that of the second conductive metal, and a resin outside the metal layer and then curing the same to form a conductive resin layer.

The forming of the metal layer may be performed using a sintering method, a sputtering method, or a plating method.

The forming of the metal layer may include coating a paste for a metal layer including a first conductive metal powder and a binder resin on an outer surface of the capacitor body, and then heat-treating the paste at a temperature higher than the curing temperature of the binder resin by greater than or equal to about 400° C. while removing the binder resin to sinter the conductive metal powder and to form a metal layer.

The paste for the metal layer may not include glass frit.

The paste for the metal layer may include about 30 parts by weight to about 60 parts by weight of the binder resin based on 100 parts by weight of the first conductive metal.

In the forming of the metal layer, the heat-treating temperature may be about 600° C. to about 900° C.

The paste for the conductive resin layer may include about 5 parts by weight to about 30 parts by weight of the resin based on 100 parts by weight of the second conductive metal.

The paste for the conductive resin layer may include about 5 parts by weight to about 30 parts by weight of the low melting point metal based on 100 parts by weight of the second conductive metal.

The paste for the conductive resin layer may be coated to be disposed only on the band portion.

The forming of the external electrode may further include forming a plating layer on the outside of the conductive resin layer by using a plating method.

The multilayered capacitor according to some aspects may enhance bending strength characteristics while securing equivalent series resistance (ESR) characteristics.

DETAILED DESCRIPTION OF THE EMBODIMENTS

Figure 1:
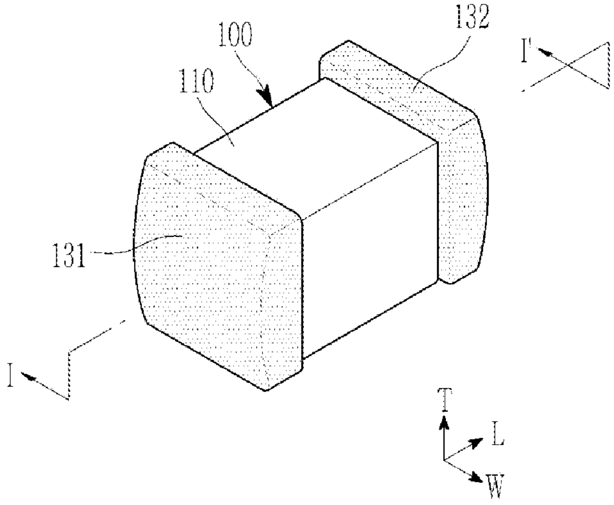
FIG. 1 is a perspective view illustrating a multilayered capacitor according to one aspect.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

The term "about," as used herein, means approximately. In general, the term "about" is used herein to modify a numerical value above and below the stated value by a variance of 10%. In one aspect, the term "about" means plus or minus 20% of the numerical value of the number with which it is being used.

Figure 2:
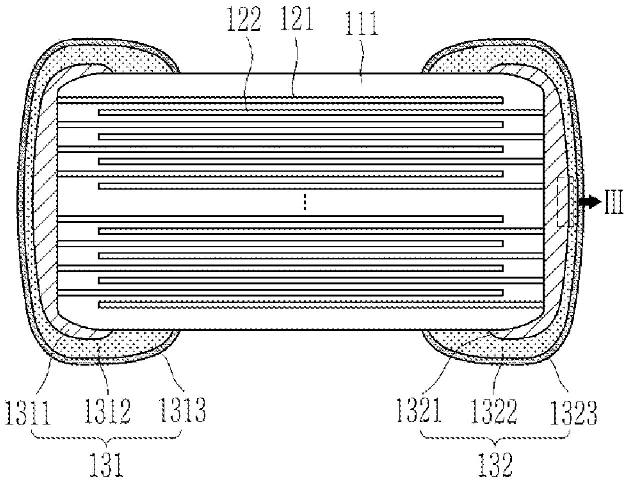
FIG. 2 is a cross-sectional view of the multilayered capacitor taken along line I-I' of FIG. 1.
Figure 3:
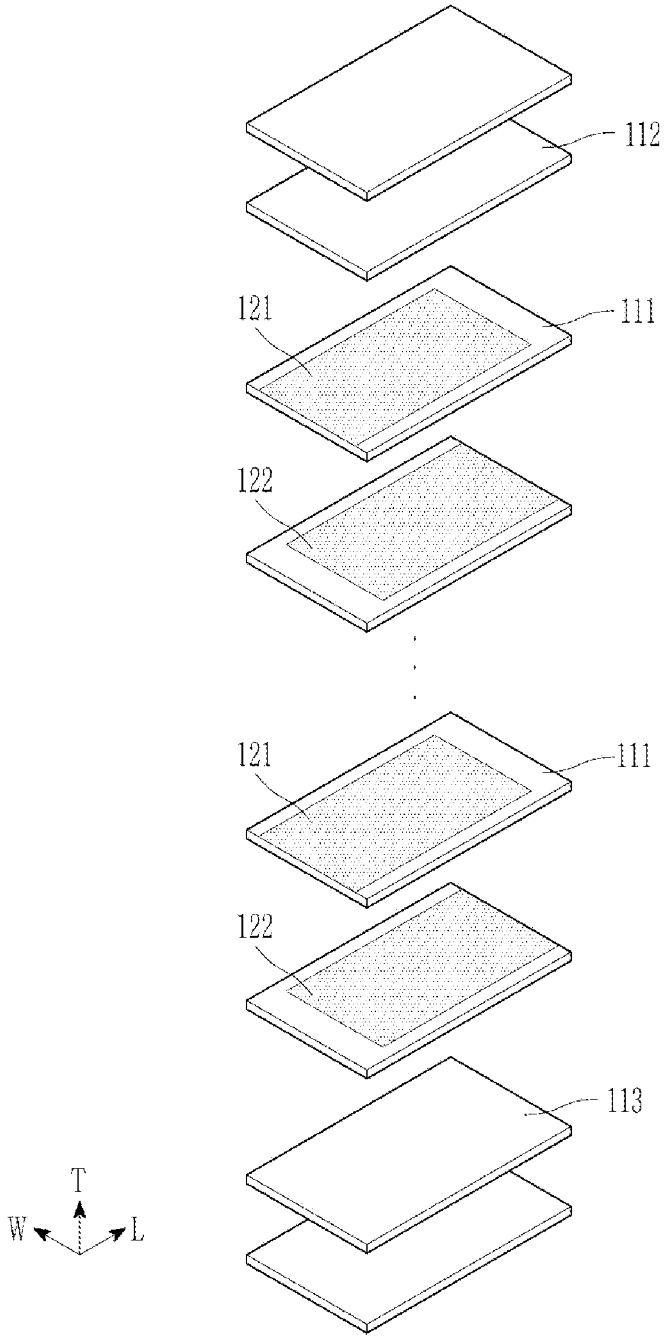
FIG. 3 is an exploded perspective view illustrating a stacked structure of internal electrodes in the capacitor body of FIG. 1.

FIG. 1 is a perspective view illustrating a multilayered capacitor according to one aspect, FIG. 2 is a cross-sectional view of the multilayered capacitor taken along line I-I' of FIG. 1, and FIG. 3 is an exploded perspective view illustrating a stacked structure of internal electrodes in the capacitor body of FIG. 1.

When directions are defined to clearly describe the present aspect, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Accordingly, a first direction that is a direction in which the dielectric layer 111 and the first and second internal electrodes 121 and 122 are stacked, may be a thickness direction (T-axis direction), and a second direction and a third direction perpendicular to the first direction and perpendicular to each other may be a longitudinal direction (L-axis direction) and a width direction (W-axis direction) or a width direction (W-axis direction) and a longitudinal direction (L-axis direction), respectively.

Referring to FIGS. 1 to 3, the multilayered capacitor 100 may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In the present disclosure, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces. For example, the first surface, which is a lower surface, may be a surface facing a mounting direction. In addition, the first to sixth surfaces may be flat, but is not limited thereto, and for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 may be formed by stacking a plurality of the dielectric layers 111 in the thickness direction (T-axis direction) and then firing them, and includes a plurality of dielectric layers 111, and a plurality of first and second internal electrodes 121 and 122 which are alternately disposed in the thickness direction (T-axis direction) with the dielectric layers 111 interposed therebetween. In this case, the first and second internal electrodes 121 and 122 may have different polarities.

Herein, the boundary between the respective dielectric layers 111 adjacent to each other of the capacitor body 110 may be integrated to the extent that it is difficult to check without using a scanning electron microscope (SEM). Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for forming an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

For example, in some embodiments, the dielectric layer 111 may include a ceramic material having a high dielectric constant. For example, the ceramic material may include a dielectric ceramic containing components such as $BaTiO_3$, $CaTiO_3$, $SrTiO_3$, or $CaZrO_3$. In addition, auxiliary components such as a Mn compound, a Fe compound, a Cr compound, a Co compound, and a Ni compound may be further included in addition to dielectric ceramic components. For example, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) in which Ca, Zr, etc. are partially dissolved in $BaTiO_3$-based dielectric ceramics.

In addition, a ceramic powder, a ceramic additive, an organic solvent, a plasticizer, a binder, a dispersant, and the like may be further added to the dielectric layer 111. The ceramic additive may include, for example, transition metal oxide or transition metal carbide, a rare earth element, magnesium (Mg), or aluminum (Al), and the like.

For example, an average thickness of the dielectric layer 111 may be about 0.5 μm to about 10 μm.

The first and second internal electrodes 121 and 122 are electrodes having different polarities, and are alternately disposed to face each other along the thickness direction (T-axis direction) with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal selected from the group consisting of nickel (Ni), copper (Cu), silver (Ag), palladium (Pd), or gold (Au), and the like, and an alloy thereof. For example, in some embodiments, The first and second internal electrodes 121 and 122 may include an Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the thickness direction (T-axis direction) in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces of the capacitor body 110 and the first and second surfaces or the fifth and sixth surfaces thereof meet.

The first and second band portions may extend from the first and second connection portions to portions of the first and second surfaces or the fifth and sixth surfaces of the capacitor body 110, respectively. The first and second band portions may serve to improve an adhesion strength of the first and second external electrodes 131 and 132.

Figure 4:
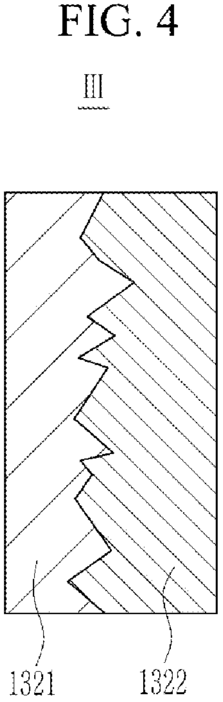
FIG. 4 is an enlarged cross-sectional view of portion III in FIG. 2.

FIG. 4 is an enlarged cross-sectional view of region III of FIG. 2, and is a schematic cross-sectional view of the enlarged second external electrode 132. FIG. 4 shows the second external electrode 132 alone, but the first external electrode 131 may also have similar characteristics to those of the second external electrode 132 shown in FIG. 4. Hereinafter, referring to FIG. 4, the first and second external electrodes 131 and 132 of the present aspect are illustrated in detail.

For example, the first and second external electrodes 131 and 132 may include first and second metal layers 1311 and 1321 contacting the capacitor body 110, conductive resin layers 1312 and 1322 configured to cover the first and second metal layers 1311 and 1321, and optionally plating layers 1313 and 1323 configured to cover the conductive resin layers 1312 and 1322, respectively.

The first and second metal layers 1311 and 1321 directly contact the capacitor body 110 and are respectively disposed on the third and fourth surfaces of the capacitor body 110 to be connected to the first and second internal electrodes 121 and 122. The first and second metal layers 1311 and 1321 may be disposed in the first and second connection portions and the first and second band portions, respectively. That is, the first metal layer 1311 may be disposed on the first surface, the second surface, the fourth surface, the fifth surface, and the sixth surface. The second metal layer 1312 may be disposed on the first surface, the second surface, the third surface, the fifth surface, and the sixth surface.

The first and second metal layers 1311 and 1321 may include a first conductive metal.

The first and second metal layers 1311 and 1321 may include at least one selected from the group consisting of copper (Cu), nickel (Ni), silver (Ag), palladium (Pd), gold (Au), platinum (Pt), tungsten (W), titanium (Ti), an alloy thereof, and combinations thereof. For example, in some embodiments, the copper (Cu) may include a copper (Cu) alloy. When the first conductive metal includes copper (Cu), metals other than copper may be included in an amount of less than or equal to about 5 parts by mole based on 100 parts by mole of copper.

For example, the first and second metal layers 1311 and 1321 may be formed substantially of only the first conductive metal and may not include glass and a binder resin. As the first and second metal layers 1311 and 1321 may be made of only the first conductive metal, equivalent series resistance characteristics may be improved compared to the case where glass and a binder resin are further included.

For example, the glass may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

In addition, the binder resin may include, for example, epoxy, ethyl cellulose, acrylic, or butyral.

As described later, the first and second metal layers 1311 and 1321, including the first conductive metal alone without containing glass and binder resin, may be formed by coating a paste for the metal layer including the first conductive metal powder and a binder resin outside the capacitor body 110, and then sintering the first conductive metal powder while removing the binder resin by heat treatment at a temperature higher than a curing temperature of the binder resin by 400° C. or higher. Accordingly, outer surfaces of the first and second metal layers 1311 and 1321 may have surface roughness. However, the present aspect is not limited thereto, and the metal layers 1311 and 1321 made of the first conductive metal alone may be manufactured by sputtering or plating.

Hereinafter, an average surface roughness (Ra) of the first and second metal layers 1311 and 1321, each average area of the metal layers 1311 and 1321 and the conductive resin layers 1312 and 1322, an average area and a type of each component, etc. may be analyzed by examining a cross section (L-axis direction and T-axis direction cross-section) of the multilayered capacitor 100 cut at the center (½ point) of the width direction (W-axis direction) in the longitudinal direction and the stacking direction perpendicular to the width direction (W-axis direction) or a cross-section (hereinafter, referred to as “cross-section”) of the multilayered capacitor 100 cut at the center (½ point) of the longitudinal direction (L-axis direction) in the width direction (W-axis direction) and the stacking direction (T-axis direction) perpendicular to the longitudinal direction (L-axis direction) with a scanning electron microscope (SEM) or a scanning transmission electron microscope (STEM), etc.

A cross-section sample of the multilayered capacitor 100 may be, for example, prepared by mounting the multilayered capacitor 100 in an epoxy mold, polishing the multilayered capacitor 100, until a cross-section thereof is exposed, and coating it for 10 seconds with a Pt coater.

The scanning electron microscope (SEM) may be, for example, Verios G4 manufactured by ThermoFisher Scientific Inc., which is used at 3000 magnification times, so that the first and second external electrodes 131 and 132 may be exposed about 70 μm outward from the interface between the first and second external electrodes 131 and 132 and the dielectric layer 111.

The average surface roughness (Ra) of the metal layers 1311 and 1321 may be measured with New View made by Zygo Corp. by using a cross-section image taken through the examination with SEM or STEM. New View is one of the representative interferometers and uses white light in a scanning method. As a non-destructive analysis such as XRD does no damage on a sample, a non-contact roughness meter also may measure a surface shape and thus surface roughness with no damage. Its measurement principle is that samples are irradiated by a white light source in the middle, while a CCD (charged-coupled device) camera is positioned at the top. The white light source, unlike a laser with a short wavelength, has many available wavelengths without a fixed wavelength and causes polarization interference. The interferometer is driven in a vertical direction to collect interference fringes. Herein, PZT is used. When the interference is further increased through a beam splitter, a portion with constructive interference appears white, while a portion with destructive interference appears black. This interference fringe may be spread out and focused by moving a stage where the sample is placed to detect height information and thus measure the surface roughness.

Average areas and components of the first conductive metal of the first and second metal layers 1311 and 1321, the resin, the second conductive metal, the low melting point metal, and the alloy of the second conductive metal and the low melting point metal of the first and second conductive resin layers 1312 and 1322, may be measured by taking cross-section photographs with SEM or STEM, and the like and analyzing the images with an electron beam microanalyzer (EPMA). When the component analysis is performed with the electron beam microanalyzer (EPMA), an energy dispersive spectroscope (EDS), or an wavelength dispersive spectroscope (WDS), as an X-ray spectrometer may be used.

For example, when the cross-sections of the first and second external electrodes 131 and 132 are examined by using a reflected electron image of SEM, an HAADF image of STEM, or the like, the first conductive metal, the second conductive metal, the low melting point metal, or the alloy of the second conductive metal and the low melting point metal alloy having a metallic bond may be recognized as a bright part in contrast, and non-metal components such as the resin or pore such as the resin, the conductive polymer particles, and the like may be recognized as a dark part in the contrast. Accordingly, the average area of the first conductive metal of the first and second metal layers 1311 and 1321, the resin, the second conductive metal, the low melting point metal, or the alloy of the second conductive metal and the low melting point metal alloy, and the like of the first and second conductive resin layers 1312 and 1322 may be obtained as a ratio of the area of a portion having a different contrast to the area of the entire measurement visual field, for example, by binarizing a cross-sectional photograph.

The average surface roughness (Ra) of the first and second metal layers 1311 and 1321 may be about 0.2 to about 1, for example, about 0.3 to about 0.4.

The first and second metal layers 1311 and 1321 may not substantially include glass. For example, in the cross-section, an area ratio of the glass included in the metal layers 1311 and 1321 may be less than or equal to about 2%, less than or equal to about 1%, or less than or equal to about 0.1%, or greater than or equal to 0% or more.

In addition, the first and second metal layers 1311 and 1321 may not substantially include a binder resin. For example, in the cross-section, an area ratio of the binder resin included in the first and second metal layers 1311 and 1321 may be less than or equal to about 1%, or less than or equal to about 0.1%, or greater than or equal to 0%.

Herein, the area ratio of the glass or binder resin of the first and second metal layers 1311 and 1321 may be a percentage (%) of the area occupied by the glass or binder resin of the unit area of the first and second metal layers 1311 and 1321 to the unit area of the metal layers 1311 and 1321.

In addition, the area ratio of the glass or the binder resin of the first and second metal layers 1311 and 1321 may be measured within a unit area with a width of about 1 μm to about 100 μm and a length of about 1 μm to about 100 μm, for example, about 10 μm×about 2 μm located in the first and second metal layers 1311 and 1321 in the cross-section photograph taken with SEM or STEM, and the like.

Herein, when the first and second metal layers 1311 and 1321 are disposed in the first and second connection portions, the unit area may be located where a center (½) point of the thickness direction (T-axis direction) length is a point that the first and second external electrodes 131 and 132 all including the first and second metal layers 1311 and 1321, the first and second conductive resin layers 1312 and 1322, and the first and second plating layers 1313 and 1323, respectively, have the thickest thickness (i.e., L-axis direction length).

On the other hand, when the first and second metal layers 1311 and 1321 are located in the first and second band portions, the unit area may be located where a center (½) of the longitudinal direction (L-axis direction) length is a point that the first and second external electrodes 131 and 132 all including the first and second metal layers 1311 and 1321, the first and second conductive resin layers 1312 and 1322, and the first and second plating layers 1313 and 1323, respectively, have the thickest thickness (i.e., T-axis direction length).

However, the unit area entirely must be located within the first and second metal layers 1311 and 1321.

The first and second conductive resin layers 1312 and 1322 are disposed on an outside of the metal layers 1311 and 1321.

The first and second conductive resin layers 1312 and 1322 are positioned on the third and fourth surfaces of the capacitor body 110, respectively, and may extend to the first and second surfaces or the fifth and sixth surfaces of the capacitor body 110. In other words, the first and second conductive resin layers 1312 and 1322 may be located in the first and second connection portions and the first and second band portions.

A length of a region (i.e., first and second band portions) where the first and second conductive resin layers 1312 and 1322 extend to the first and second surfaces or the fifth and sixth surfaces of the capacitor body 110 may be longer than that of a region (i.e., first and second band portions) where the first and second metal layers 1311 and 1321 extend to the first and second surfaces or the fifth and sixth surfaces of the capacitor body 110. In other words, the first and second conductive resin layers 1312 and 1322 are formed on the first and second metal layers 1311 and 1321 to completely cover the first and second metal layers 1311 and 1321, respectively.

The first and second conductive resin layers 1312 and 1322 include a resin and a second conductive metal.

The resin included in the conductive resin layers 1312 and 1322 may not be particularly limited as long as it has bondability and impact absorption properties and can be mixed with the conductive metal powder to form a paste, and may include, for example, a phenolic resin, an acrylic resin, a silicone resin, an epoxy resin, a polyimide resin, or mixture thereof.

The second conductive metal included in the conductive resin layers 1312 and 1322 may serve to be electrically connected to the metal layers 1311 and 1321 or the plating layers 1313 and 1323.

For example, the second conductive metal may include at least one selected from the group consisting of copper (Cu), nickel (Ni), silver (Ag), palladium (Pd), gold (Au), platinum (Pt), tungsten (W), titanium (Ti), an alloy thereof, and combinations thereof. The same metal may be used as the first conductive metal and the second conductive metal.

The second conductive metal included in the conductive resin layers 1312 and 1322 may have a spherical shape, a flake shape, or a combination thereof. That is, the second conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) is less than or equal to about 1.45. The flake-shaped powder means a powder having a flat and elongated shape, and is not particularly limited, but, for example, a length ratio between a major axis and a minor axis (long axis/short axis) may be greater than or equal to about 1.95.

On the other hand, when the metal layers 1311 and 1321 are made of the first conductive metal alone and include neither the glass nor the binder resin, it is difficult to relieve stress by deformation of the mounted board, causing cracks. Accordingly, since the conductive resin layers 1312 and 1322 further include a low melting point metal and an alloy of the low melting point metal with the second conductive metal in addition to the resin and the second conductive metal, equivalent series resistance (ESR) characteristics may not only be secured by the metal layers 1311 and 1321, but also the bending strength characteristics deteriorated by the metal layers 1311 and 1321 may be compensated.

For example, the low melting point metal may have a lower melting point than that of the second conductive metal.

The low melting point metal may be any metal having a lower melting point than that of the second conductive metal without a particular limitation, for example, may include at least one selected from the group consisting of tin (Sn), lead (Pb), bismuth (Bi), silver (Ag), copper (Cu), an alloy thereof, and combinations thereof.

The second conductive metal and the low melting point metal included in the conductive resin layers 1312 and 1322 may exist as an alloy. For example, in some embodiments, when the second conductive metal is copper (Cu), and the low melting point metal is tin (Sn), the alloy of the second conductive metal and the low melting point metal may be, for example, $Cu_6Sn_5$ or $Cu_3S$, and when the second conductive metal is silver (Ag). In some embodiments, the low melting point metal is tin (Sn), the alloy of the second conductive metal and the low melting point metal may be, for example, $Ag_3Sn$.

For example, in some embodiments, in the cross-section, an area ratio of the resin included in the conductive resin layers 1312 and 1322 may be about 5% to about 30%, for example, about 5% to about 20%, or about 5% to about 12%. In some embodiments, when the area ratio of the resin included in the conductive resin layers 1312 and 1322 is less than about 5%, the bending strength characteristics may be deteriorated. In some embodiments, when the ratio is greater than about 30%, ESR characteristics may be deteriorated.

In some embodiments, in the cross-section of the conductive resin layers 1312 and 1322, an area ratio of the second conductive metal, the low melting point metal, the alloy of the second conductive metal and the low melting point metal, or a combination thereof be about 5% to about 30%, for example about 5% to about 20%, or about 8% to about 15%. When the area ratio of the second conductive metal, the low melting point metal, the alloy of the second conductive metal and the low melting point metal, or a combination thereof in the cross-section of the conductive resin layers 1312 and 1322 is less than about 5%, the ESR characteristics may be deteriorated. In some embodiments, when the area ratio is greater than about 30%, the bending strength characteristics may be deteriorated.

Herein, the area ratio of the resin, the second conductive metal, and the like included in the cross-section of the conductive resin layers 1312 and 1322 may be a percentage (%) of an area of the resin, the second conductive metal, and the like in the unit area of the conductive resin layers 1312 and 1322 to the unit area of the conductive resin layers 1312 and 1322.

In addition, the area ratio of the resin, the second conductive metal, and the like of the conductive resin layers 1312 and 1322, in the cross-section photograph of SEM or STEM, etc., may be measured within a unit area with a size of a width of about 1 μm to about 100 μm and a length of about 1 μm to about 100 μm, for example, about 10 μm×about 2 μm in the conductive resin layers 1312 and 1322.

Herein, when the conductive resin layers 1312 and 1322 are disposed in the first and second connection portions, the unit area may be located where the center (½) point of the thickness direction (T-axis direction) length is a point that the first and second external electrodes 131 and 132 all including the metal layers 1311 and 1321, the conductive resin layers 1312 and 1322, and the plating layers 1313 and 1323 have the thickest thickness (i.e., L-axis direction length).

On the other hand, when the conductive resin layers 1312 and 1322 are disposed in the first and second band portions, the unit area may be located where the center (½) point of the longitudinal direction (L-axis direction) length is a point that the first and second external electrodes 131 and 132 all including the metal layers 1311 and 1321, the conductive resin layers 1312 and 1322, and the plating layers 1313 and 1323 have the thickest thickness (i.e., T-axis direction length).

However, the unit area entirely must be located within the conductive resin layers 1312 and 1322.

Figure 5:
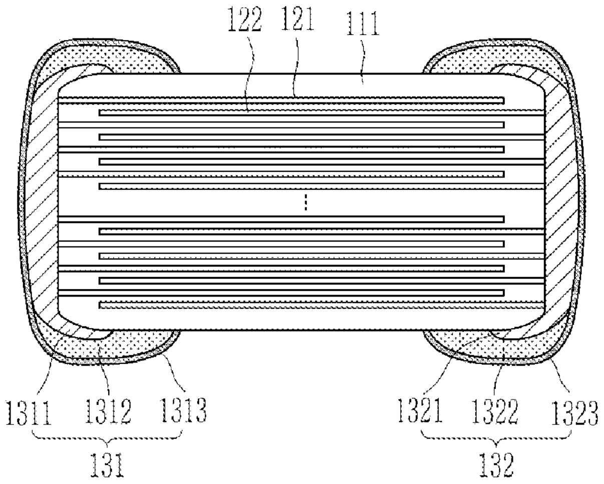
FIG. 5 is a cross-sectional view of a modified example of a multilayered capacitor according to one aspect.

FIG. 5 is a cross-sectional view of a modified example of a multilayered capacitor according to some aspects.

Since the multilayered capacitor 100 according to the modified example is similar to the multilayered capacitor 100 described above, overlapping descriptions will be omitted and description will focus on the differences.

In FIG. 2, the first conductive resin layer 1312 is disposed on the first surface, the second surface, the fourth surface, the fifth surface, and the sixth surface of the capacitor body 110. The second conductive resin layer 1322 is disposed on the first surface, the second surface, the third surface, the fifth surface, and the sixth surface of the capacitor body 110. The connection portions and the band portions to completely cover the metal layers 1311 and 1321.

On the contrary, FIG. 5 shows that the first and second conductive resin layers 1312 and 1322 are not disposed on the third and fourth surfaces of the capacitor body 110 but disposed on the first surface, the second surface, the fifth surface, and the sixth surface alone. In other words, the first and second conductive resin layers 1312 and 1322 are not disposed in the connection portions but disposed in the band portions.

When the first and second conductive resin layers 1312 and 1322 are disposed in the band portions alone, the equivalent series resistance characteristics may not only be secured by the first and second metal layers 1311 and 1321, but also the bending strength characteristics deteriorated by the first and second metal layers 1311 and 1321 may be further enhanced.

Optionally, the first and second external electrode 131 and 132 may further include the plating layers 1313 and 1323 disposed on the outer surface of the conductive resin layers 1312 and 1322.

The plating layers 1313 and 1323 may be disposed on the third and fourth surfaces of the capacitor body 110 and extend to the first and second surfaces or the fifth and sixth surfaces of the capacitor body 110. In other words, the plating layers 1313 and 1323 may be disposed in the first and second connection portions and the first and second band portions. A thickness of a region (i.e., first and second band portions) where the plating layers 1313 and 1323 extend to the first and second surfaces or the fifth and sixth surfaces of the capacitor body 110 may be longer than that of the region (i.e., first and second band portions) where the conductive resin layers 1312 and 1322 extend to the first and second surfaces or the fifth and sixth surfaces of the capacitor body 110. In other words, the plating layers 1313 and 1323 are formed on the conductive resin layers 1312 and 1322 to completely cover the metal layers 1311 and 1321 and the conductive resin layers 1312 and 1322.

The plating layers 1313 and 1323 may include at least one selected from the group consisting of nickel (Ni), copper (Cu), tin (Sn), palladium (Pd), platinum (Pt), gold (Au), silver (Ag), tungsten (W), titanium (Ti), or lead (Pb) alone, and an alloy thereof. For example, the plating layers 1313 and 1323 may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layers 1313 and 1323 may include a plurality of nickel (Ni) plating layers and/or a plurality of tin (Sn) plating layers.

The plating layers 1313 and 1323 may improve mountability of the multilayered capacitor 100 with a board, structural reliability, external durability, heat resistance, and equivalent series resistance (ESR).

A method of manufacturing a multilayered capacitor according to another example embodiment includes manufacturing a capacitor body including a dielectric layer and an internal electrode, and forming an external electrode outside the capacitor body.

First, the manufacturing of the capacitor body is described. In the manufacturing process of the capacitor body, a dielectric paste to become the dielectric layer after firing and a conductive paste to become the internal electrode after firing are prepared.

The dielectric paste is prepared, for example, by the following method. Ceramic materials are uniformly mixed by means such as wet mixing, dried, and heat-treated under predetermined conditions to obtain calcined powder. To the obtained calcined powder, an organic vehicle or an aqueous vehicle is added and kneaded to prepare a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0\times10^{-14}$ MPa to about $1.0\times10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about $1.0\times10^{-9}$ MPa to about $1.0\times10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrode on the outer surfaces of the third and fourth surfaces, thereby improving the electrical connection of the first and second external electrodes and first and second internal electrodes and easily forming the alloy portion.

A metal layer may be formed by coating a paste for a metal layer on the outer surface of the obtained capacitor body and then sintering the paste. However, this aspect is not limited thereto, and the metal layer may be manufactured by a method such as a sputtering method or a plating method.

The paste for the metal layer may include the first conductive metal powder and a binder resin. At this time, the paste for the metal layer does not include a glass frit. Since descriptions of the first conductive metal, the binder resin, and the glass are the same as those described above, repetitive descriptions will be omitted.

In addition, the paste for the metal layer may optionally include subcomponents such as a solvent, a dispersant, a plasticizer, or an oxide powder. For example, the solvent may include an organic solvent such as terpineol, butyl carbitol, alcohol, methylethylketone, acetone, or toluene, or an aqueous solvent.

For example, the paste for the metal layer may include the binder resin in an amount of about 30 parts by weight to about 60 parts by weight, for example, about 40 parts by weight to about 50 parts by weight based on about 100 parts by weight of the first conductive metal. When the binder resin is included in an amount of less than about 30 parts by weight in the paste for the metal layer, density of the metal may decrease during the sintering, deteriorating electric characteristics and moisture resistance reliability, but when the binder resin is included in an amount of greater than about 60 parts by weight, the binder may not be completely removed, deteriorating the ESR characteristics.

A method of coating the paste for the metal layer on the outer surface of the capacitor body may include various printing methods such as a dip method, screen printing, or the like, a coating method using a dispenser, a spraying method using a spray, or the like. The paste for the metal layer is at least coated on the third and fourth surfaces of the capacitor body and optionally, on a portion of the first surface, the second surface, the fifth surface, or the sixth surface where the band portions of the first and second external electrodes are formed.

Subsequently, the capacitor body coated with the paste for the metal layer is dried and heat-treated at greater than or equal to about 400° C., which is higher than a curing temperature of the binder resin, to sinter the first conductive metal powder, while removing the binder resin, and thus form a metal layer. For example, the curing temperature of the binder resin may be about 200° C. to about 240° C., and accordingly, the heat-treating temperature may be about 600° C. to about 900° C. or about 630° C. to about 850° C., and the heat treatment time may be about 70 minutes to about 160 minutes or about 70 minutes to about 120 minutes.

When the heat-treating temperature is less than about 600° C., the sintering may not be completed, lowering density, and the heat-treating temperature has no upper limit, unless it affects the capacitor body, but, for example, less than or equal to about 900° C.

Accordingly, the metal layer, which includes neither the glass nor the binder resin but is made of the first conductive metal alone, may have surface roughness on the outer surface.

On the outer surface of the metal layer, a paste for the conductive resin layer is coated and cured to form a conductive resin layer.

The paste for the conductive resin layer may include a resin and second conductive metal powder. In addition, the paste for the conductive resin layer may further include a low melting point metal having a melting point lower than that of the second conductive metal. Description of the resin, the second conductive metal, and the low melting point metal is the same as above and thus will not be repeatedly illustrated.

In addition, the paste for the conductive resin layer may optionally include a subcomponent such as a binder, a solvent, a dispersant, a plasticizer, or oxide powder, and the like. For example, the binder may include ethyl cellulose, acryl, butyral, or the like, and the solvent may include an organic solvent such as terpineol, butyl carbitol, alcohol, methylethylketone, acetone, or toluene, and the like or an aqueous solvent.

For example, the paste for the conductive resin layer may include the resin in an amount of about 5 parts by weight to about 30 parts by weight, for example, about 5 parts by weight to about 13 parts by weight based on 100 parts by weight of the second conductive metal. When the content of the resin in the paste for the conductive resin layer is less than 5 parts by weight, bending strength may be deteriorated, and when it exceeds 30 parts by weight, ESR characteristics may be deteriorated.

For example, the paste for the conductive resin layer may include the low melting point metal in an amount of about 5 parts by weight to 30 parts by weight, or for example 10 parts by weight to 15 parts by weight based on 100 parts by weight of the second conductive metal. When the content of the low melting point metal in the conductive resin layer paste is less than 5 parts by weight, ESR characteristics may be deteriorated, and when it exceeds 30 parts by weight, bending strength characteristics may be deteriorated.

For example, a method of forming the conductive resin layer may include dipping the capacitor body 110 into the paste for the conductive resin layer to form the conductive resin layer and curing it, screen-printing or gravure-printing the paste for the conductive resin layer on the surface of the capacitor body 110, or coating the paste for the conductive resin layer on the surface of the capacitor body 110, and then curing it.

At this time, the paste for the conductive resin layer may be coated to cover a portion of the metal layer and expose another portion. For example, the paste for the conductive resin layer may be coated so as not to be disposed on the first and second connection portions and to be disposed only on the first and second band portions.

The method of coating the paste for the conductive resin layer to be disposed only on the first and second band portions is not particularly limited. For example, after forming a metal layer on the capacitor body, the paste for the conductive resin layer is coated on the metal layer, and the paste for the conductive resin layer coated on the first and second connection portions is removed using a porous nonwoven fabric to remove the conductive resin layer only on the band portion, so that the paste for the conductive resin layer may be coated only to the band portion.

Subsequently, a plating layer is formed outside the metal layer and the conductive resin layer.

For example, the fourth layer may be formed by a plating method, or may be formed by sputtering or electroplating (electric deposition).

Hereinafter, specific examples of the present embodiments are presented. However, the examples described below are only for specifically illustrating or explaining the embodiments, and the scope of the present disclosure is not limited thereto.

Preparation Example: Manufacturing of Multilayered Capacitor

Example

A paste including barium titanite ($BaTiO_3$) powder was coated on a carrier film and then dried, manufacturing a plurality of dielectric green sheets.

A conductive paste including nickel (Ni) was screen-printed on each dielectric green sheet to form a conductive paste layer.

A dielectric green sheet stack was manufactured by stacking the plurality of dielectric green sheets, while at least each portion of the conductive paste layers thereon was overlapped.

The dielectric green sheet stack was cut into individual chips, which were maintained under an air atmosphere at 230° C. for 60 hours to remove a binder and then fired at 1200° C., manufacturing a capacitor body.

Subsequently, a paste for a metal layer including copper (Cu) as a first conductive metal and a binder resin (curing temperature: 230° C.) was coated on the outer surface of the capacitor in a dip method and then, dried and sintered at 630° C. for 70 minutes, forming a metal layer.

Then, a paste for a conductive resin layer including an epoxy resin, copper (Cu) as a second conductive metal, and tin (Sn) as a low melting point metal was coated on the outer surface of the capacitor body in a dip method and then, dried and cured, forming a conductive resin layer.

Subsequently, nickel (Ni) and tin (Sn) plating proceeded, manufacturing a multilayered capacitor.

Comparative Example

A paste including barium titanite ($BaTiO_3$) powder was coated on a carrier film and then dried, manufacturing a plurality of dielectric green sheets.

A conductive paste including nickel (Ni) was screen-printed on each dielectric green sheet to form a conductive paste layer.

A dielectric green sheet stack was manufactured by stacking the plurality of dielectric green sheets, while at least each portion of the conductive paste layers thereon is overlapped.

The dielectric green sheet stack was cut into individual chips, which are maintained under an air atmosphere at 230° C. for 60 hours to remove a binder and then fired at 1200° C., manufacturing a capacitor body.

Subsequently, a paste for a metal layer including a glass frit and copper (Cu) as a conductive metal was dip-coated on the outer surface of the capacitor body, dried, and then sintered to form a metal layer.

Subsequently, a paste for a conductive resin layer including an epoxy resin and copper (Cu) powder as a conductive metal was coated on the outer surface of the capacitor in a dip method and then, dried and cured, forming a conductive resin layer.

On the capacitor body having the conductive resin layer, nickel (Ni) and tin (Sn) plating proceeded, manufacturing a multilayered capacitor.

Experimental Examples: Performance of Multilayered Capacitor

The multilayered capacitors according to the example and the comparative examples were measured with respect to surface roughness of the metal layers, bending strength, and equivalent series resistance (ESR).

1) Method for Measuring a Surface Roughness of Metal Layer

After mounting each of the multilayered capacitors by five respectively in an epoxy mold, the L-axis direction and T-axis direction surface (e.g., fifth surface) thereof was polished to about ½ of a depth along the W-axis direction and coated for 10 seconds with a Pt coater, preparing each cross-section sample.

In the prepared cross-section sample, a place where the first or second electrode was seen about 70 μm from the interface of the first or second external electrode with a dielectric layer toward the plating layer was measured with UHR-SEM (Scanning Electron Microscope) at an acceleration voltage of 10 kV at 3000 magnification times, that is, at a magnification that the interface of the metal layer with the conductive resin layer and a porous structure of the conductive resin layer are visible.

The obtained cross-section photograph was used to measure average surface roughness (Ra) of the metal layer by using New View made by Zygo Corp.

2) Method for Measuring Bending Strength

Each of the multilayered capacitors according to the example and the comparative example were prepared by 30. The multilayered capacitors were respectively mounted (soldering) on a printed circuit board (PCB) and then, fixed thereonto.

Herein, a bending strength measuring equipment was, for example, TT28025S, Keithely 6485*4, Keithely 6487*1 made by Tira.

Bending strength of the multilayered capacitors was evaluated by conducting a three-point bending experiment, wherein the board mounted with each of the multilayered capacitors was placed between two supports at an interval of 90 mm, so that the multilayered capacitor may be positioned in the middle, and connected to a measuring instrument to measure initial charge charging and a leakage current during the evaluation. When the connection was completed, the bending strength-measuring equipment was used to push the board to bend the multilayered capacitor and simultaneously, check whether or not charges charged in the multilayered capacitor are leaked in a current-measuring method, when 5 mm pressed down. Subsequently, the cross-section of the multilayered capacitor is examined to determine its defect mode.

3) Method for Measuring Equivalent Series Resistance (ESR)

Each of the multilayered capacitors according to the example and the comparative example was prepared by 200. The multilayered capacitors were mounted (soldered) on a board (PCB) capable of mounting 400 multilayered capacitors and then, once put into a reflow facility with a peak temperature of 290° C. The reflowed board was put into an impedance analyzer equipment to measure ESR in a temperature frequency environment of 1 MHz.

The ESR measuring equipment was for example Impedance Analyzer made by JK Tech Ltd.

The multilayered capacitors according to the example and the comparative example were measured with respect to average surface roughness (Ra) on the outer surface of the metal layer, bending strength, and equivalent series resistance, and the results are shown in Table 1. In addition, a scanning electron microscope (SEM) image of the metal layer of the multilayered capacitor according to the example is shown in FIG. 6.

TABLE 1

| | | Example | Comparative Example |
|---|---|---|---|
| Average surface roughness (Ra) | | 0.4 | 0.1 |
| 3 mm bending strength | Number of failures | 0/30 | 3/30 |
| | Failure rate (%) | 0% | 10% |
| ESR (mΩ) | | 1-2 | 1-2 |

Referring to Table 1, the average surface roughness (Ra) on the outer surface of the metal layer of the multilayered capacitor of the example was 0.4, while the average surface roughness (Ra) on the outer surface of the metal layer of the multilayered capacitor of the comparative example is 0.1.

In addition, the multilayered capacitor of the example had no defects but secures bending strength characteristics.

In addition, the multilayered capacitor of the example, compared with the multilayered capacitor of the comparative example, secures equivalent series resistance characteristics as well as exhibits excellent bending strength characteristics.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
112, 113: cover region
121: first internal electrode
122: second internal electrode
131: first external electrode
132: second external electrode
1311, 1321: metal layer
1312, 1322: conductive resin layer
1313, 1323: plating layer

What is claimed is:

1. A multilayered capacitor, comprising
a capacitor body including a dielectric layer and an internal electrode, and
an external electrode outside the capacitor body,
wherein the external electrode includes
a metal layer disposed on an outside surface of the capacitor body and comprising a first conductive metal, and
a conductive resin layer disposed outside the metal layer and including a resin, a second conductive metal, a low melting point metal having a melting point lower than a melting point of the second conductive metal, and an alloy of the second conductive metal and the low melting point metal.

2. The multilayered capacitor of claim 1, wherein
the multilayered capacitor has a first direction that is a direction in which the dielectric layer and internal electrode are stacked and a second direction and a third direction perpendicular to the first direction and perpendicular to each other, and
the capacitor body has first and second surfaces facing each other in a first direction, third and fourth surfaces facing each other in a second direction, and fifth and sixth surfaces facing each other in a third direction.

3. The multilayered capacitor of claim 2, wherein
in a cross section cut in the first direction and the third direction perpendicular to the second direction at a center of the second direction,
an average surface roughness (RA) of the metal layer is about 0.2 to about 1.

4. The multilayered capacitor of claim 2, wherein
in a cross section cut in the first direction and the third direction perpendicular to the second direction at a center of the second direction,
the conductive resin layer has an area ratio of the resin included in a unit area of the conductive resin layer of about 5% to about 30% and each area ratio of the second conductive metal, the low melting point metal, and the alloy of the second conductive metal and the low melting point metal included in the unit area of the conductive resin layer of about 5% to about 30% relative a unit area of the conductive resin layer.

5. The multilayered capacitor of claim 2, wherein
the external electrode further includes a plating layer outside the conductive resin layer.

6. The multilayered capacitor of claim 5, wherein
the external electrode has a connection portion outside the third and fourth surfaces of the capacitor body and a band portion extending from the connection portion onto the first and second surfaces of the capacitor body.

7. The multilayered capacitor of claim 6, wherein
the metal layer, the conductive resin layer, and the plating layer are disposed on the connection portion and the band portion.

8. The multilayered capacitor of claim 6, wherein
the metal layer is disposed on the connection portion and the band portion,
the conductive resin layer is disposed on the band portion, and
the plating layer is disposed on the connection portion and the band portion.

9. The multilayered capacitor of claim 1, wherein
the metal layer has a surface roughness on an outer surface.

10. The multilayered capacitor of claim 1, wherein
the metal layer does not include glass and a binder resin.

11. The multilayered capacitor of claim 1, wherein
in a cross section cut in the first direction and the third direction perpendicular to the second direction at a center of the second direction,
the metal layer has an area ratio of glass included in a unit area of the metal layer of less than or equal to about 2% and an area ratio of binder resin included in a unit area of the metal layer of less than or equal to about 1% relative a unit area of the metal layer.

12. The multilayered capacitor of claim 1, wherein
the first conductive metal or the second conductive metal includes at least one selected from the group consisting of copper (Cu), nickel (Ni), silver (Ag), palladium (Pd), gold (Au), platinum (Pt), tungsten (W), titanium (Ti), an alloy thereof, and combinations thereof.

13. The multilayered capacitor of claim 1, wherein
the low melting point metal includes at least one selected from the group consisting of tin (Sn), lead (Pb), bismuth (Bi), silver (Ag), copper (Cu), an alloy thereof, and combinations thereof.

14. A method of manufacturing a multilayered capacitor, comprising
preparing a capacitor body including a dielectric layer and an internal electrode, and
disposing an external electrode on an outer surface the capacitor body,
wherein the disposing of the external electrode includes
disposing a metal layer including a first conductive metal on the outer surface of the capacitor body, and
coating a paste for a conductive resin layer including a second conductive metal powder, a low melting point metal having a melting point lower than a melting point of the second conductive metal powder, an alloy of the second conductive metal powder and the low melting point metal, and a resin on an outer surface of the metal layer, and curing the conductive resin layer to form a conductive resin layer.

15. The method of claim 14, wherein the disposing the metal layer includes using a sintering method, a sputtering method, or a plating method.

16. The method of claim 15, wherein the disposing the metal layer includes coating a paste for the metal layer including a first conductive metal powder and a binder resin on the outer surface of the capacitor body, and then heat-treating the paste for the metal layer at a temperature higher than a curing temperature of the binder resin by greater than or equal to about 400° C. while removing the binder resin to sinter the conductive metal powder and to form a metal layer.

17. The method of claim 16, wherein the paste for the metal layer includes about 30 parts by weight to about 60 parts by weight of the binder resin based on 100 parts by weight of the first conductive metal.

18. The method of claim 16, wherein in the forming of the metal layer, the heat-treating temperature is about 600° C. to about 900° C.

19. The method of claim 14, wherein the paste for the conductive resin layer includes about 5 parts by weight to about 30 parts by weight of the resin and about 5 parts by weight to about 30 parts by weight of the low melting point metal based on 100 parts by weight of the second conductive metal.

20. The method of claim 14, wherein the multilayered capacitor has a first direction in which the dielectric layer and the internal electrode are stacked, and a second direction and a third direction perpendicular to the first direction and perpendicular to each other, the capacitor body has first and second surfaces facing each other in a first direction, third and fourth surfaces facing each other in a second direction, and fifth and sixth surfaces facing each other in a third direction, the external electrode has a connection portion outside the third and fourth surfaces of the capacitor body and a band portion extending from the connection portion onto the first and second surfaces of the capacitor body, and the paste for the conductive resin layer is coated so as to be disposed only on the band portion.

* * * * *